US012171697B1

(12) United States Patent
Garvin

(10) Patent No.: US 12,171,697 B1
(45) Date of Patent: Dec. 24, 2024

(54) CREMATION BOX

(71) Applicant: CHICAGO CREMATION SUPPLIES, Posen, IL (US)

(72) Inventor: John Garvin, Posen, IL (US)

(73) Assignee: CHICAGO CREMATION SUPPLIES, Posen, IL (US)

( * ) Notice: Subject to any disclaimer, the term of this patent is extended or adjusted under 35 U.S.C. 154(b) by 0 days.

(21) Appl. No.: 18/351,640

(22) Filed: Jul. 13, 2023

(51) Int. Cl.
*A61G 17/00* (2006.01)
*A61G 17/007* (2006.01)

(52) U.S. Cl.
CPC ........ *A61G 17/004* (2016.11); *A61G 17/0073* (2013.01)

(58) Field of Classification Search
CPC .............. A61G 17/004; A61G 17/0073; A61G 17/001; A61G 17/034; B65D 5/18; B65D 5/30; B65D 5/308; B65D 5/4279
See application file for complete search history.

(56) References Cited

U.S. PATENT DOCUMENTS

| | | | | |
|---|---|---|---|---|
| 4,156,956 A | | 6/1979 | Callaway et al. | |
| 5,307,545 A | * | 5/1994 | Stoltz | A61G 17/0073 27/14 |
| 5,586,679 A | | 12/1996 | Thomas | |
| 5,623,752 A | | 4/1997 | Gillard et al. | |
| 5,661,879 A | | 9/1997 | Kelly | |
| 6,145,175 A | * | 11/2000 | Enneking | B65D 5/68 27/19 |
| 7,003,855 B2 | | 2/2006 | Lew | |
| 7,255,261 B2 | | 8/2007 | Mesly | |
| 8,104,151 B2 | * | 1/2012 | Cox | A61G 17/004 27/4 |
| 9,056,040 B2 | | 6/2015 | Gesell et al. | |
| 9,078,798 B2 | | 7/2015 | Centenari | |
| 9,763,844 B2 | | 9/2017 | Krinsky | |
| 11,504,291 B2 | * | 11/2022 | Davis | A61G 17/0073 |
| 2007/0084028 A1 | * | 4/2007 | Cox | A61G 17/004 27/4 |
| 2012/0073098 A1 | * | 3/2012 | Centenari | A61G 17/041 27/19 |
| 2014/0230203 A1 | * | 8/2014 | Cox | A61G 17/047 27/4 |

(Continued)

FOREIGN PATENT DOCUMENTS

| | | |
|---|---|---|
| AT | 508919 B1 | 5/2011 |
| DE | 202004016375 U1 | 2/2005 |
| FR | 2800604 A1 | 5/2011 |

(Continued)

*Primary Examiner* — William L Miller
(74) *Attorney, Agent, or Firm* — Greer Burns & Crain Ltd.

(57) ABSTRACT

A cremation box includes a base and a lid. The base has a rectangular bottom section with a pair of long base panels and a pair of short base panels formed by creases in the cardboard. Each of the long base panels has a pair of long base transverse edges cut along lines substantially in line with the creases between the base rectangular bottom section and the short base panels, creating a pair of flaps on opposite sides of the short base panels. When assembled, the flaps are secured to the long base panels to form four corners. The lid has a similar bottom section, long panels and short panels formed by creases, and flaps that form corners. The flaps are secured to the long panels by tabs and cuts in the panels.

6 Claims, 7 Drawing Sheets

(56) References Cited

U.S. PATENT DOCUMENTS

| | | | | |
|---|---|---|---|---|
| 2021/0059885 | A1* | 3/2021 | Davis ................. | A61G 17/0073 |
| 2024/0164972 | A1* | 5/2024 | Davis ................... | A61G 17/034 |

FOREIGN PATENT DOCUMENTS

| | | | |
|---|---|---|---|
| FR | 2994836 | B1 | 3/2014 |
| GB | 2346137 | B | 4/2003 |
| WO | 2010148465 | A1 | 12/2010 |

* cited by examiner

CREMATION BOX

The present disclosure relates generally to containers, and more particularly, to cardboard cremation boxes which are used to transport deceased persons and aid in the cremation process.

BACKGROUND

A casket for cremation can resemble conventual burial caskets but are designed for presenting the deceased so the casket shell can be reused. The deceased human is placed in a cardboard box, and the box is placed inside a casket shell. After the ceremony, the box (with the body) is transferred to a crematorium. The deceased body is then incinerated in the box. In this way, the wooden casket can be re-used.

If the deceased body is not going to be present for the ceremony, the deceased body still needs to be contained. A direct cremation box (DCB) allows the body to be stored and safely contained until the cremation is scheduled. A DCB also simplifies transportation of the deceased.

Cardboard cremation boxes must have sufficient strength and stiffness to contain the body of the deceased through several moves and not excessively twist, deflect, or otherwise have its shape significantly distorted under the load of the deceased.

Cremation boxes are made by die-cutting blank cardboard sheets. The die-cut sheets are shipped to customers, and the customers fold the sheets into boxes. If the unassembled blank sheets are larger than a certain size, such as 4 feet by 8 feet, over dimension fees are charged for shipping. Thus, there is a need for cardboard cremation boxes which have sufficient strength when assembled, and avoid added shipping charges when unassembled.

SUMMARY

In keeping with one aspect of the invention, a cremation box includes a base and a lid.

The base is preferably made of a single sheet of corrugated cardboard, and has a pair of opposed long edges and a pair of opposed short edges. The outside dimensions of the base sheet are preferably four feet by eight feet or less.

The base has a rectangular bottom section flanked by a pair of long base panels and a pair of short base panels formed by creases in the cardboard. The creases for the long base panels extend from one short edge to the opposing short edge. The creases for the short base panels extend between the creases for the long base panels.

Each of the long base panels has a pair of long base transverse edges cut along lines substantially parallel to and in line with the creases for the short base panels. The cuts form flaps adjacent to the opposite ends of the short base panels. The base is assembled by folding the long base panels and the short base panels so as to be perpendicular to the bottom section. When so assembled, the long base panels extend between the short base creases. Assembly is completed by securing the base flaps to the long base panels to form four base corners, as will be seen.

Each of the base corners is formed adjacent an end of a long base panel, and includes one of the base flaps. Each end of the long base panels has a tab proximate to and parallel with each of the long base transverse edges. The tabs are vertically oriented when the base is assembled, and point inwardly. Each of the short base panel flaps includes an opening that is also vertical when the base is assembled, and receives a corresponding one of the vertical tabs of the long base panel.

Each of the corner ends of the long base panels also has an angled tab proximate to and oriented at an acute angle with respect to each of the long base transverse edges. Each of the short base panel flaps includes an angled slot which receives a corresponding angled tab of the long base panel.

The lid is also fabricated from a single piece of corrugated cardboard, preferably 4 feet by 8 feet or less. The lid has a rectangular lid bottom section with a pair of long lid panels and a pair of short lid panels formed by creases in the cardboard. Each of the long lid panels has a pair of long lid transverse edges cut along lines substantially parallel to the creases between the lid rectangular bottom section and the short lid panels, and each of the short lid panels has a pair of tabs on opposite sides of the short lid panels. The lid is assembled by folding the long lid panels and the short lid panels so as to be perpendicular to the lid bottom section. When so assembled, the long lid panels extend between the short lid creases. Assembly is completed by securing the lid flaps to the long lid panels to form four lid corners.

When assembled, the short lid panel tabs are secured to the long lid panels to form four lid corners. Each of the long lid panels has a curved slit proximate to each of the long lid panel transverse edges. A mitten on each of the pair of tabs engages with a corresponding curved slit of the long lid panels.

The strength afforded by the combination of the vertical tabs and angled tabs in the corners of the base provide adequate strength, and allow the size of the cardboard sheets for both the base and the lid to be 4 feet by 8 feet or less, which avoids upcharges for shipping.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
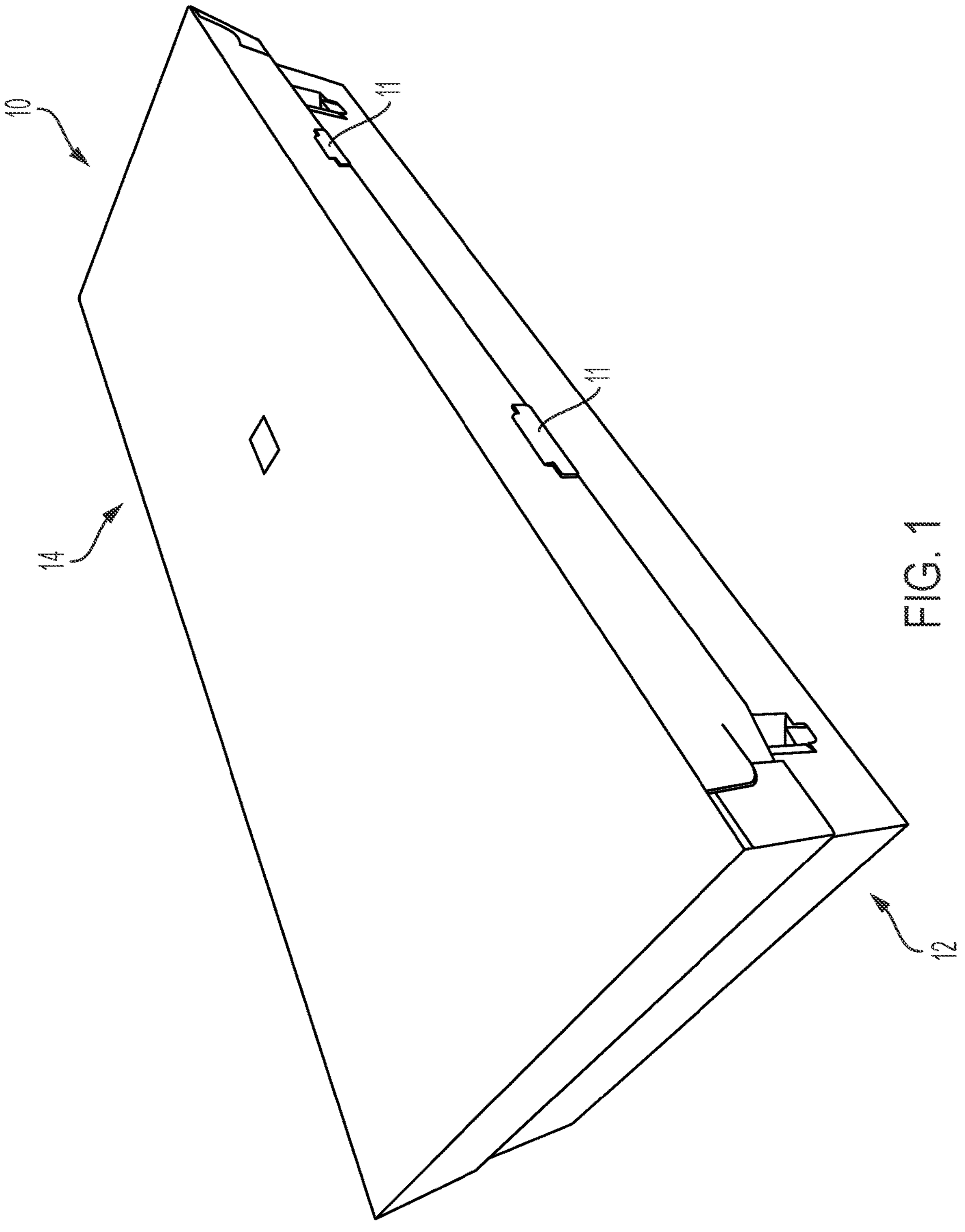
FIG. 1 shows a top perspective view of a closed cremation box.

As seen in FIG. 1, a cremation box 10 has a base 12 and a lid 14. The base 12 and lid 14 are preferably formed from flat sheets of corrugated cardboard which are die cut to form the structural features of the base and lid, including creases, cuts, tabs and openings, as will be seen. The lid 14 is secured to the base 12 by pressing tabs 11 in the lid 14 into openings (not shown in FIG. 1) in the base 12. The box 10 can be transported by grasping the resulting openings and lifting the box 10.

Figure 2:
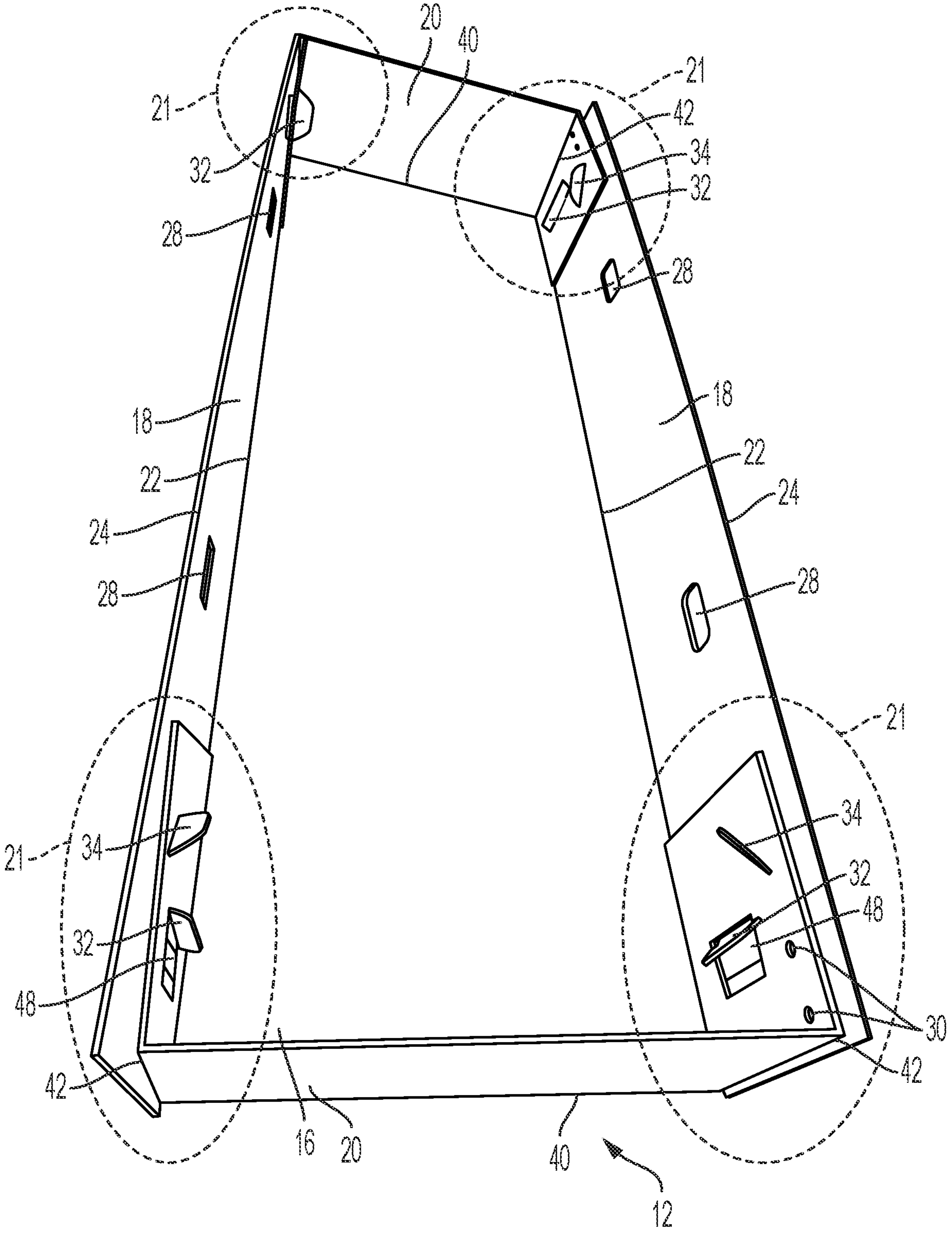
FIG. 2 shows a top perspective view of an assembled base of the cremation box of FIG. 1.
Figure 3A:
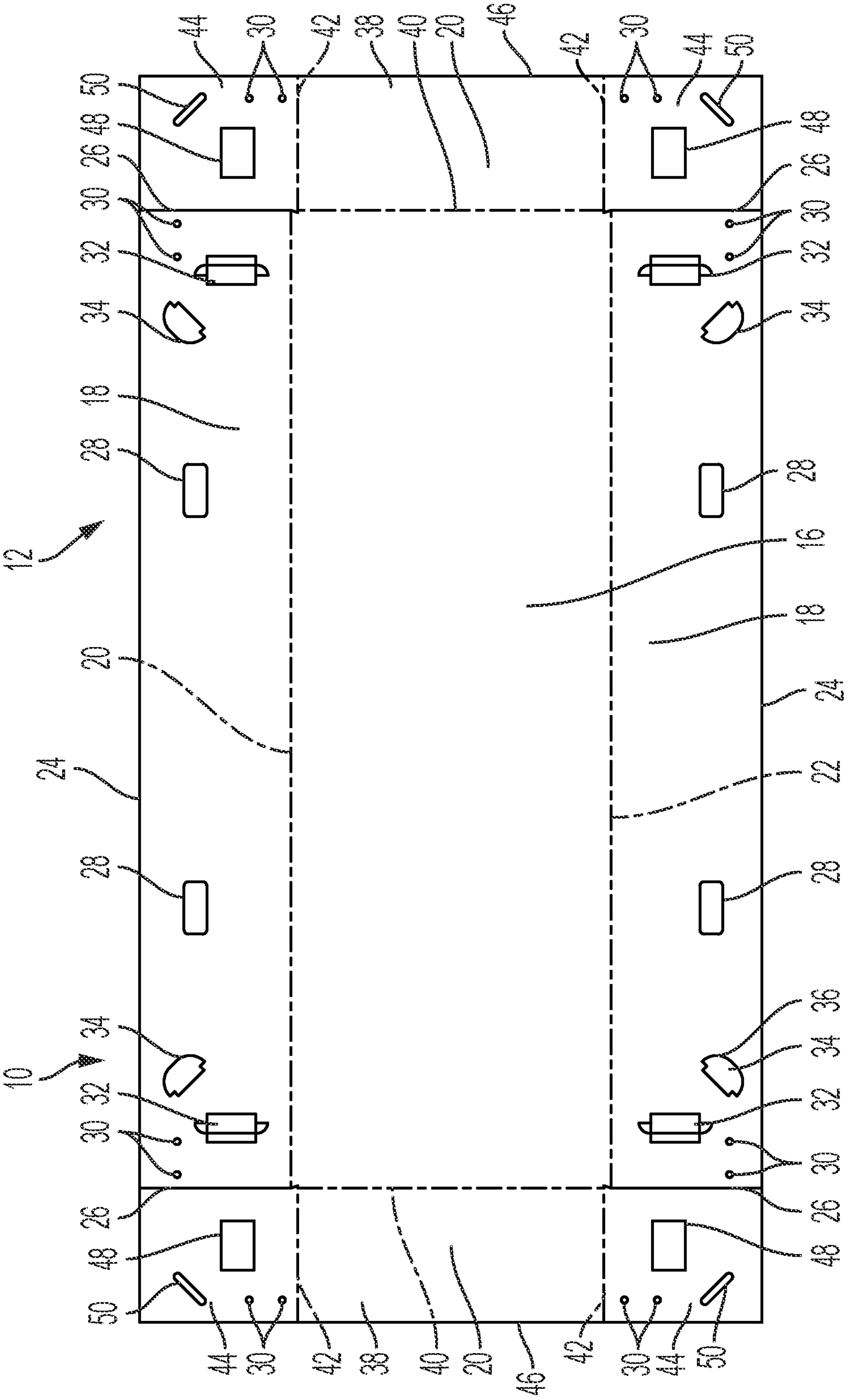
FIG. 3*a* shows the shape of a blank designed for forming the base of FIG. 2.
Figure 3B:
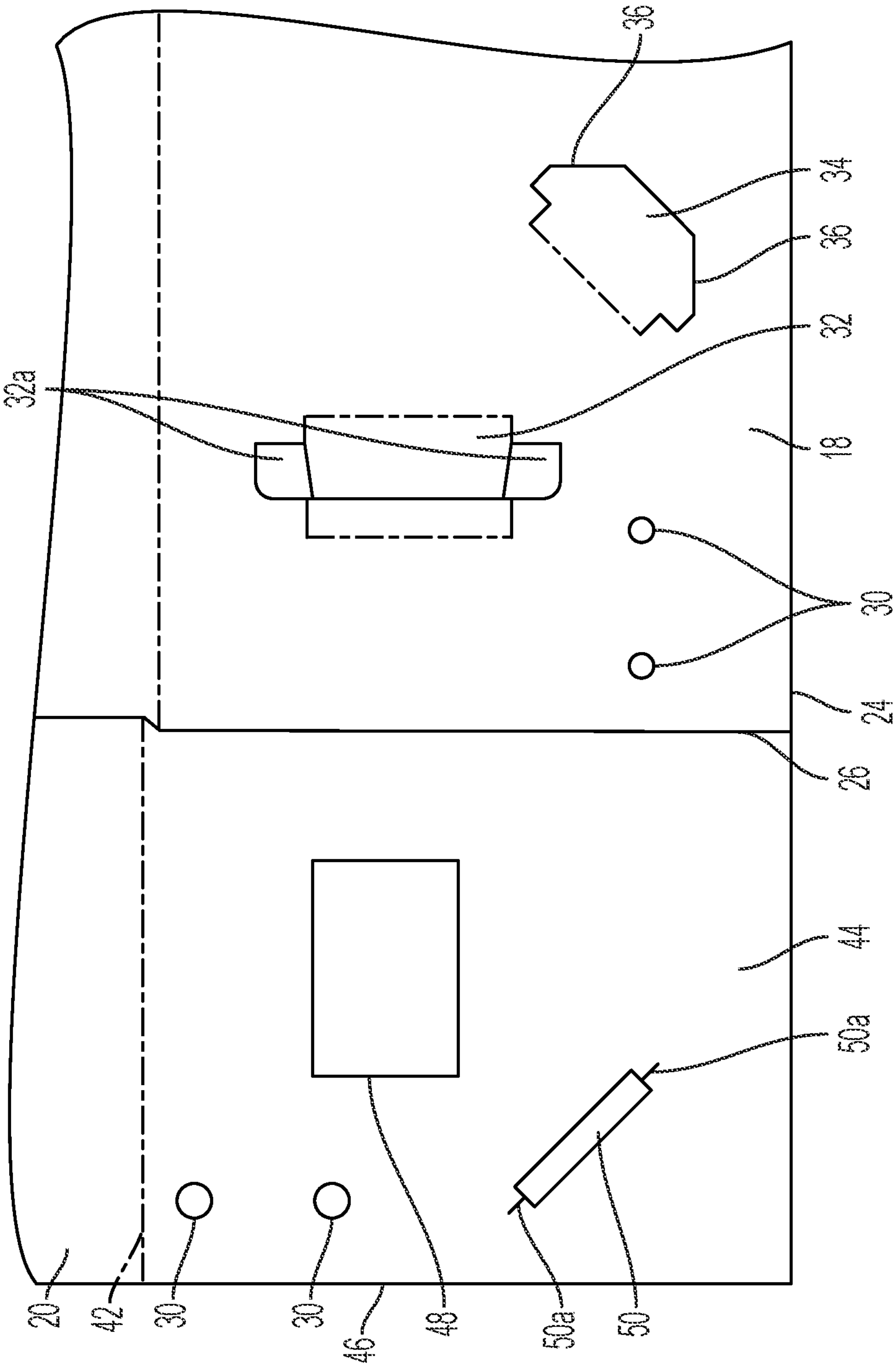
FIG. 3*b* shows an enlarged view of a corner of the blank of FIG. 3*a;*
Figure 4:
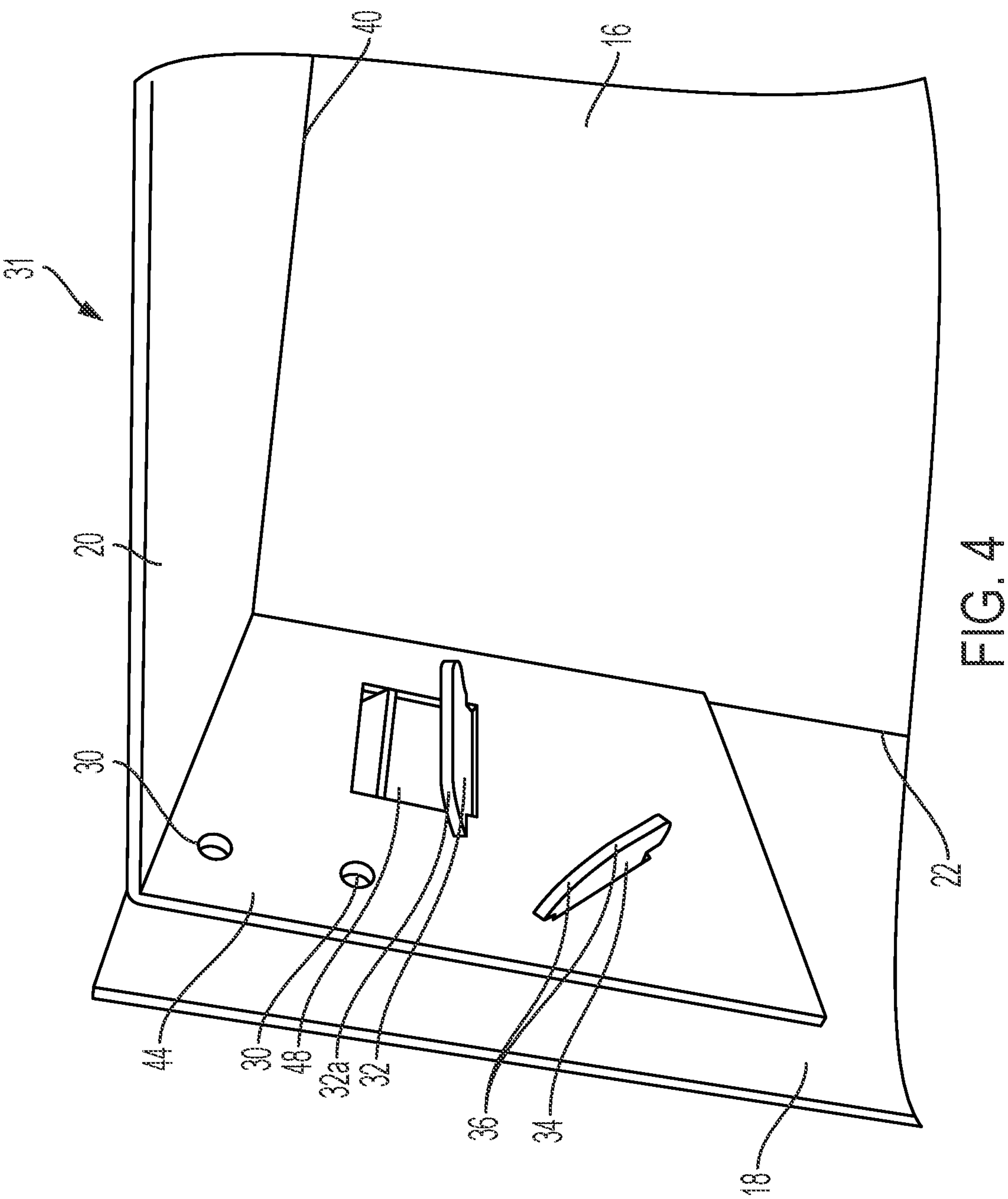
FIG. 4 shows an enlarged view of a corner of the assembled base of FIG. 2.

As seen in FIGS. 2-4, the base 12 has a rectangular bottom section 16, a pair of opposed parallel long base panels 18, a pair of opposed parallel short base panels 20, and four corners 21. The base 12 also includes a crease 22 where the base bottom section 16 meets the long base panels 18. The long base panels 18 include an outside terminal edge 24 and a pair of transverse edges 26.

A pair of base handle openings 28 are provided on each of the long base panels 18, spaced apart from the terminal edges 24. Preferably, the base handle openings 28 are spaced closer to the terminal edges 24 than the crease 22. The long base panels 18 optionally include a pair of through holes 30 proximate to each of the transverse edges 26 which are spaced an equal distance from the terminal edge 24. Cable ties can be put in the through holes 30 for added stability, if desired.

The long base panel 18 also includes vertical tabs 32, with pairs of ears 32*a* (FIG. 3B), which are proximate to and parallel with each of the transverse edges 26, such that each of the four base corners 21 includes one of the vertical tabs 32. Each vertical tab 32 points inwardly toward a space above the base rectangular bottom section 16 when the base 12 is assembled.

Moreover, the long base panels 18 preferably include an angled tab 34 proximate to and oriented at an acute angle with respect to each of the transverse edges 26 such that each of the four base corners 21 includes one of the angled tabs 32. Each of the angled tabs 34 points inwardly toward the space above the base rectangular bottom section 16 when the base 12 is assembled. As seen in FIG. 4, the angled tabs 34 preferably extend inwardly toward the space above the base rectangular bottom section 16 at an angle substantially perpendicular to the long base panels 18 when the base 12 is assembled. As also seen in FIG. 4, the angled tabs 34 optionally include chamfered edges 36.

Each short base panel 20 includes a central portion 38 with a crease 40 between the rectangular bottom section 16 and the central portion. The transverse edges 26 are cut along lines substantially in line with the creases 40 between the rectangular bottom section 16 and the short base panels 20. Additionally, a pair of vertical creases 42 are formed between the central portion 38 and a pair of base flaps 44. The short base panels also include outside terminal edges 46 opposite the horizontal base creases 40. The short base panels 20 optionally include a pair of through holes 30 on each of the base flaps 44 proximate to each of the vertical base creases 42. Preferably, the holes 30 of the short base flaps 44 align with the corresponding through holes 30 of the long base panels 20. The through holes 30 in the long base panels 20 and the base flaps 44 optionally receive an additional fastening means, such as cable ties, which help secure the long base panels to the base flaps.

The base flaps 44 include a vertical opening 48 which receives a corresponding vertical tab 32 of the long base panel 20. Specifically, the vertical tab ears 32*a* engage a portion of the base flap 44 around the vertical opening 48 when the base 12 is assembled.

The short base panels 22 also include an angled slot 50 on each of the base flaps 44 which receives a corresponding angled tab 34 of the long base panel 18. The chamfered edges 36 facilitate insertion of the angled tab 36 into the angled slot 50. The angled slots 50 preferably include slits 50*a* located on opposite ends of the angled slot which also facilitate insertion of the chamfered edges 36 of the angled tab 34 into the angled slot. Accordingly, each of the four base corners 21 includes one of the vertical openings 28 and one of the angled slots 50.

When the vertical tabs 32 and the angled tabs 34 engage the vertical opening 48 and the angled slot 50, respectively, the short base panel flaps 44 are secured to the long base panels 18, thereby forming the four base corners 21 of the assembled base 12. The four base corners 21 are substantially the same.

Figure 5:
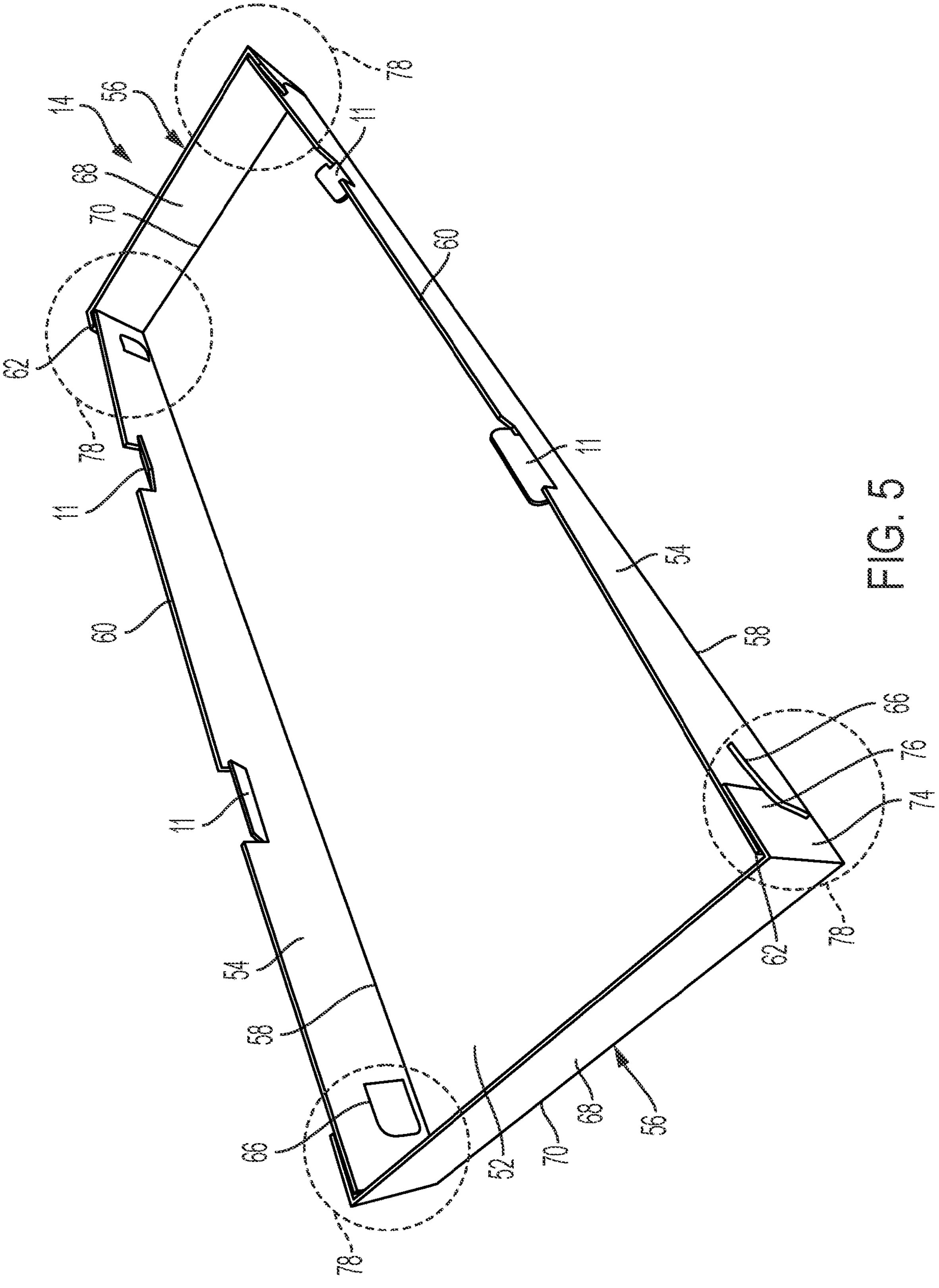
FIG. 5 shows a bottom perspective view of an assembled lid of the cremation box of FIG. 1.
Figure 6:
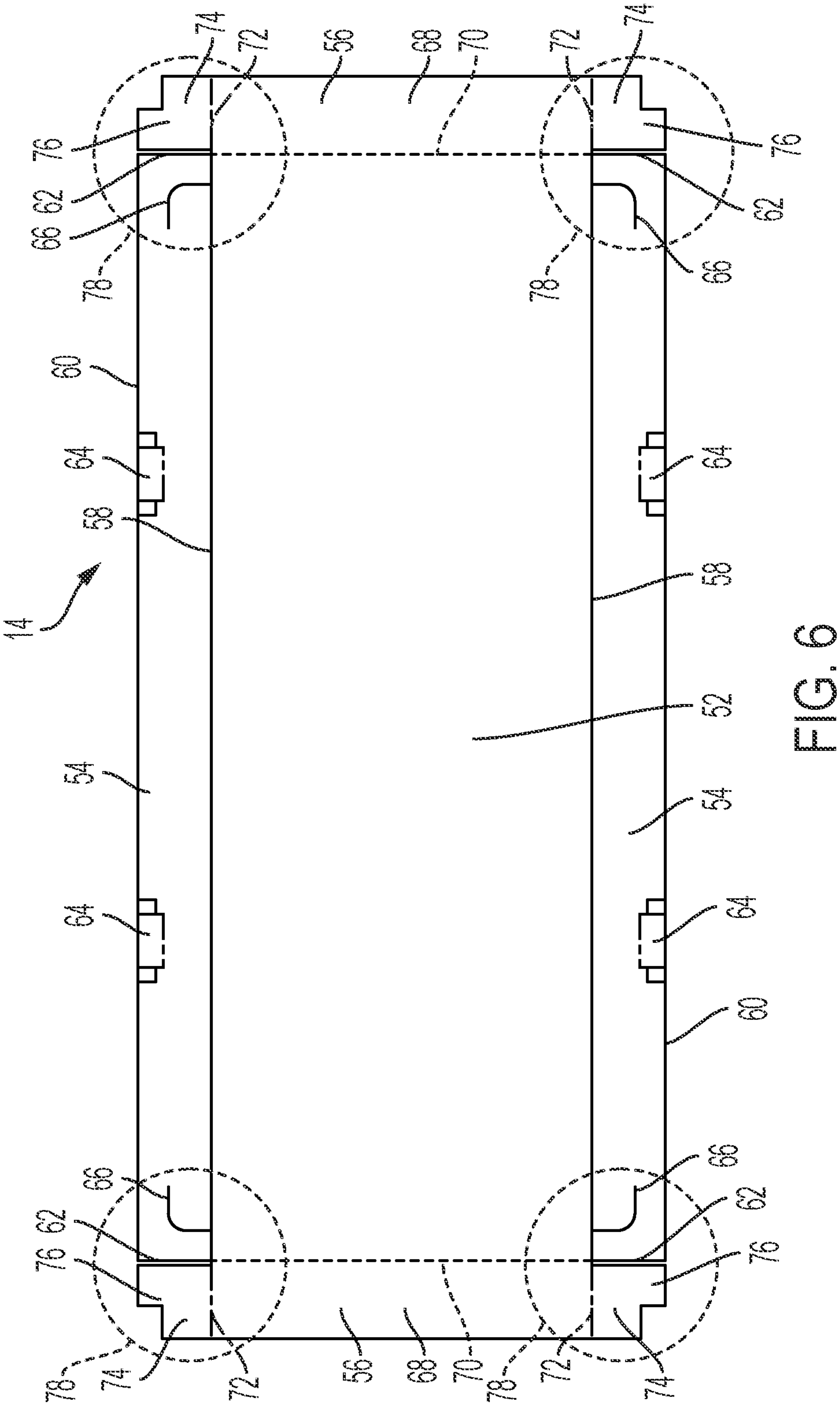
FIG. 6 shows the shape of a blank designed for forming the lid of FIG. 5.

As seen in FIGS. 5-6, the lid 14 has a rectangular bottom section 52 with a pair of long lid panels 54 and a pair of short lid panels 56. A pair of creases 58 divide the long lid panels 54 from the rectangular bottom section 52. The long lid panel 54 includes a terminal edge 60 and a pair of transverse edges 62. The pressing tabs 11 are disposed on the terminal edge 60, such that the pressing tabs 11 point inwardly toward a space below the lid rectangular bottom section 52 when the lid 14 is assembled and placed on the base 12, and the pair of pressing tabs 11 are received by the handle openings 30 of the base 12. The long lid panels 54 also include a pair of curved slits 66, which are proximate to each of the transverse edges 62.

Each short lid panel 56 includes a central portion 68 with a short horizontal lid crease 70 where the lid rectangular bottom section 52 connects with the central portion 68. The transverse edges 62 are cut along lines substantially in line with the creases 70 between the lid rectangular bottom section 52 and the short lid panels 56. A pair of short lid vertical creases 72 separate the central portion 68 from a pair of short lid panel tabs 74. A mitten 76 on each of the tabs 74 engages with a corresponding curved slit 66 of the long lid panel 54. When the mitten 76 engage the curved slits 66, the short lid panel tabs 74 are secured to the long lid panels 56, thereby forming four lid corners 78 of the assembled lid 14. The four lid corners 78 are substantially the same.

A method of making the base 12 includes providing a sheet of corrugated cardboard and forming creases between: the base rectangular bottom section 16 and the long base panels 18; the central portion 38 of the pair of short base panels 20 and the base rectangular bottom section 16; and the short base panel flaps 44 and the short base panel central portions 38. The corrugated cardboard is cut to form: the transverse edges 26 of the long base panels 18; the handle openings 28, the holes 30; the vertical tabs 32, the angled tabs 34, the vertical openings 48, and the angled slots 50. Finally, the short base panel flaps 44 are secured to the long base panels 18, thereby forming the corners 21 of the assembled base 12.

A method of making the lid 14 includes providing a sheet of corrugated cardboard and forming creases between: the lid rectangular bottom section 52 and the long lid panels 54; the central portion 68 of the pair of short lid panels 56 and the lid rectangular bottom section 52; and the short lid panel flaps 74 and the short lid panel central portions 68. Then, the corrugated cardboard is cut to form: the transverse edges 62 of the long lid panels 54; the pressing tabs 11; the mittens 76, and the curved slits 66. Finally, the short lid panel flaps 74 are secured to the long lid panels 54, thereby forming the corners 78 of the assembled lid 14.

The combination of the vertical tab 32 and the angled tab 34, which engage with the vertical opening 48 and the angled slot 50, respectively, help provide strength to the base 12. In particular, the combined vertical tab 32 and angled tab 34 provide resistance to multi-direction loads which are caused by movement of the body within the cremation box 10, helping reduce the possibility of the short base panel flaps 44 becoming disengaged with the long base panels 18.

Additionally, combined vertical tab 32 and angled tab 34 resist vertical loads caused by gravity.

Also, the combination of the of the vertical tab 32 and the angled tab 34 helps reduce the overall size of the base 12. Specifically, conventional cremation boxes are designed so that the long base panels are wider than the short base panels, such that the long base panels wrap around the flaps of the short base panels, thereby interlocking the long base panels with the short base panels. However, this requires a rather large blank. Instead, the present base uses the vertical tab 32 and the angled tab 34 to lock the long base panels 18 with the short base panels 20 without the need for additional cardboard. Thus, the present base 12 requires less cardboard and provides sufficient strength.

Additionally, including the handle openings 28 and the pressing tabs allows interlocking of the lid 14 and the base 12 of the cremation box when fully assembled without the need for fasteners. By locking the lid 14 to the base 12, the cremation box 10 becomes a stronger product with good load capacity because the lid provides a structural function.

Moreover, the base 12 and the lid 14 of the cremation box 10 are preferably made with flat sheets of corrugated cardboard which have dimensions of 4 feet by 8 feet or less. This means that the blanks which form the base 12 and lid 14 are preferably dimensioned to avoid over dimension fees when being transported, while still providing the benefits of the cremation box 10 when assembled.

While the principles of the invention have been described above in connection with specific apparatus and applications, it is to be understood that this description is made only by way of example and not as a limitation on the scope of the invention.

The invention claimed is:

1. A cremation box comprising:

a base made of corrugated cardboard having a rectangular bottom section with a pair of long base panels and a pair of short base panels formed by creases in the cardboard, each of the long base panels having a pair of long base transverse edges cut along lines substantially in line with the creases between the base rectangular bottom section and the short base panels, the cut edges forming flaps on opposite sides of the short base panels, wherein when assembled, the short base panel flaps are secured to the long base panels to form four base corners;

each of the corners having a vertical tab proximate to and parallel with each of the long base transverse edges, wherein the vertical tabs point inwardly when the base is assembled, and wherein each of the short base panel flaps includes a vertical opening which receives a corresponding one of the vertical tabs of the long base panels, each of the corners further including an angled tab proximate to and oriented at an acute angle with respect to each of the long base transverse edges, and wherein each of the short base panel flaps includes an angled slot which receives a corresponding one of the angled tabs of the long base panels.

2. The cremation box of claim 1, further comprising a lid made of corrugated cardboard having a lid rectangular bottom section with a pair of long lid panels and a pair of short lid panels formed by creases in the cardboard, each of the long lid panels having a pair of long lid transverse edges cut along lines substantially in line with the creases between the lid rectangular bottom section and the short lid panels, and each of the short lid panels having a pair of tabs on opposite sides of the short lid panels, wherein when assembled, the short lid panel tabs are secured to the long lid panels to form four corners;

each of the long lid panels having a curved slit proximate to each of the long lid panel transverse edges; and wherein a mitten on each of the pair of tabs engages with a corresponding curved slit of the long lid panels.

3. The cremation box of claim 2, wherein each of the long base panels includes a pair of base handle openings spaced apart from a terminal edge of the long base panels.

4. The cremation box of claim 3, wherein each of the long lid panels includes a pair of pressing tabs on a terminal edge of the long lid panels, wherein the pressing tabs point inwardly when the lid is assembled and wherein the pair of pressing tabs are received by the handle openings of the base.

5. The cremation box of claim 1, wherein each of the angled tabs includes chamfered edges which facilitate insertion of the angled tabs into the angled slots.

6. The cremation box of claim 1, wherein each of the angled slots includes a pair of slits on either side of the angled slot which facilitate insertion of the angled tabs into the angled slots.

* * * * *